United States Patent
Berna et al.

(10) Patent No.: US 7,036,833 B1
(45) Date of Patent: May 2, 2006

(54) ADJUSTABLE LIGHTWEIGHT PLATFORM DOLLY

(76) Inventors: Greg E. Berna, 221 Dupage St., Elgin, IL (US) 60120; Thomas J. Berna, 199 Brookside Dr., Elgin, IL (US) 60123

(*) Notice: Subject to any disclaimer, the term of this patent is extended or adjusted under 35 U.S.C. 154(b) by 120 days.

(21) Appl. No.: 10/806,966

(22) Filed: Mar. 23, 2004

(51) Int. Cl.
*B62B 3/02* (2006.01)

(52) U.S. Cl. .................. 280/79.11; 280/47.34; 280/79.1; 280/166; 280/651; 280/47.37

(58) Field of Classification Search ............ 280/79.11, 280/79.2, 79.3, 79.4, 79.5, 79.6, 79.7; 16/35
See application file for complete search history.

(56) References Cited

U.S. PATENT DOCUMENTS

| | | | |
|---|---|---|---|
| 2,359,016 A | 9/1944 | Wood | |
| 4,025,676 A | 5/1977 | Koellisch | |
| 4,343,846 A | 8/1982 | Kohn | |
| 4,505,495 A * | 3/1985 | Foss et al. | 280/651 |
| 4,685,412 A | 8/1987 | Harris et al. | |
| 4,824,129 A * | 4/1989 | Rehrig | 280/79.11 |
| 4,922,574 A * | 5/1990 | Heiligenthal et al. | 16/35 R |
| 5,139,845 A | 8/1992 | Beckerman et al. | |
| 5,163,695 A | 11/1992 | Pakowsky | |
| D333,200 S | 2/1993 | Berrian | |
| 5,405,236 A | 4/1995 | Sundstrom et al. | |
| 5,921,566 A * | 7/1999 | Kern et al. | 280/79.11 |
| 6,199,879 B1 | 3/2001 | Cino et al. | |
| 2003/0086776 A1 | 5/2003 | Nadram et al. | |

* cited by examiner

*Primary Examiner*—J. Allen Shriver
*Assistant Examiner*—Cynthia F. Collado
(74) *Attorney, Agent, or Firm*—Mathew R. P. Perrone, Jr.

(57) ABSTRACT

A lightweight platform dolly with a one-piece lightweight composite fabricated support platform has a rectangular support platform with at least one bumper block. The bumper blocks can be adjusted to accommodate varying loads and conditions. The adjustable bumper blocks change the length or width of the lightweight platform dolly, raise the load on the lightweight platform dolly for better vertical clearance, and enable the lightweight platform dolly to accommodate uneven bottom items. The bumper blocks are secured with flexible hinges and T-Bar block holders and receivers, which can secure loads.

16 Claims, 7 Drawing Sheets

ADJUSTABLE LIGHTWEIGHT PLATFORM DOLLY

This invention relates to a platform dolly and more particularly to a platform dolly which is light weight and adjustable, depending on the item being supported thereon.

BACKGROUND OF THE INVENTION

Every thing or item used in a business or a home spends some time on a truck, before it reaches its final destination. Whether such an item or movement falls into the class of commercial, industrial, electronic, or residential; it has spent time on a truck. Loading and unloading a truck requires physical labor along with careful planning. Careful planning involves using the space available efficiently, filling the truck as full as possible without exceeding the weight limit.

Loading and unloading a truck also requires physical labor. Over the course of time, the moving industry uses a device known generically as a dolly to reduce and support the physical labor. A dolly typically offers a frame, supported on wheels or casters. Once an item is placed on the frame, the item moves with the frame more easily because of the casters on the dolly.

Dollies are used to move items or heavy objects of many types. A large object is tipped up and the dolly is placed under it. These objects usually sit on two protective coated bumper blocks. The object and the dolly are then manually rolled to a different location. The objects are not strapped or fastened to the dolly relying on the object's weight and a non-slip surface to secure the load.

Typically dollies in the industry are exemplified by piano dollies, office dollies and machine dollies. Office dollies are commonly used to move office furniture or home furniture. Machine dollies are commonly used to move industrial equipment. Piano dollies are used for the indicated musical instrument. Thus, at least three different types of dollies are used in the moving industry. These dollies customarily vary by height, length and width.

For example, a typical piano dolly is shorter in length and higher off the floor than the other dollies, in order to allow the load and the dolly to be tipped up on two wheels to ascend steps and curbs. A typical office dolly is lower in height with smaller wheels because the large office furniture, usually transported thereon, must clear doorways and is not required to ascend steps and curbs.

In the moving industry, dollies are available in varying heights and lengths for different load applications. For example, lower dollies are more effective to move tall office furniture through doorways and into elevators. Higher and shorter dollies are designed for items that need to clear steps or be tilted to climb steps. Movers need a variety of dollies on a truck to accommodate different situations. This causes problems with space and cost.

Prior art dollies are known. Some such dollies are disclosed in U.S. Pat. No. 4,720,115 to Rehrig issued in 1988; U.S. Pat. No. 4,822,066, to Rehrig issued in 1989; U.S. Pat. No. 5,921,566 to Kern issued in 1999; U.S. Pat. No. 4,077,644 to Roby issued in 1978; U.S. Pat. No. 4,824,129 to Rehrig issued in 1989; U.S. Pat. No. 5,018,930 to Hardin issued in 1991; and U.S. Pat. No. 2,359,016 to Wood issued in 1944.

Dollies are typically made of relatively heavy, solid hard wood or plastic in a rectangular frame shape with a caster fastened on the underside of each corner. Other prior art dollies such as these are injection molded plastic with steel added for strength, which adds to the weight of the dolly. These dollies also are heavy with fixed bumpers, which are not adjustable.

The rectangular frame form of a dolly is hollow in the middle, which causes difficulty when loading either small items or those items with legs, thereon. This frame type of construction is used instead of a platform, because injected plastic is too heavy.

Because dollies are manually propelled and moving industry costs are weight related, the weight of a dolly is a significant factor. Such weight relationships are usually directly proportional. The heavier dolly is harder to move and requires increased physical effort. The heavier dolly also detracts from the cargo weight, or gross weight of the entire vehicle.

Protective coverings on dollies are often a problem. Such coverings include carpet and rubber caps fastened with staples, which often come loose and expose sharp staple ends. One prior art dolly has an attempted improvement for the dolly, with protective raised rubber pads on all four sides. However, this padded dolly still consists of an open rectangular frame. The frame provides less area on which a load may be secured than a platform with no adjustability.

One prior art dolly is adjustable, but is limited to either items with solid frames and items with toe region indentations. It is heavy, and its low clearance makes it almost impossible to negotiate changes in elevations.

Another prior art dolly is adjustable in height only and requires extensive time to strap each item to the dolly. The wheels are hinged, which can cause the load to shift or break the casters. Casters may also buckle and lock, thereby dumping the load.

Other prior art dollies have some adjustable features. However, adjustments involve heavy, complex mechanical devices and pertain to relocating the wheel configuration. These devices add considerable weight and make the dolly cumbersome to carry. The adjustable wheel location designs are limited to a specific task or load. These prior art dollies lack universal application and are not easily portable.

It thus becomes clear that a lightweight, adjustable platform dolly can provide a great advantage for the moving industry. More work can be handled with a lightweight, adjustable, platform dolly capable of handling many types of items, and serving in many capacities. Such a dolly is substantially unknown in the prior art.

SUMMARY OF THE INVENTION

Among the many objectives of this invention is the provision of a platform dolly, which allows for moving a variety of items.

An additional objective of this invention is the provision of a platform dolly that is considerably lighter.

A further objective of this invention is the provision of a platform dolly with adjustments thereon.

Yet a further objective of this invention is the provision of a platform dolly, which is light weight.

Another objective of this invention is the provision of a platform dolly, to support different items.

Still, another objective of this invention is the provision of a platform dolly with a durable support platform.

An additional objective of this invention is the provision of a platform dolly, which eliminates the additional manufacturing step of providing steel channels.

A further objective of this invention is the provision of a platform dolly as strong as a comparable prior art dolly.

Yet a further objective of this invention is the provision of a platform dolly, which is more functional for items with legs.

A still further objective of this invention is the provision of a platform dolly, which causes less fatigue for workers moving large objects.

Also an objective of this invention is the provision of a platform dolly, which causes less fatigue for workers moving stacks of many dollies.

Another objective of this invention is the provision of a platform dolly, which accommodates easier loading of today's furniture and appliance designs.

Still, another objective of this invention is the provision of a platform dolly having adaptability for rolling large containers and speed pack cartons used in manufacturing plants.

These and other objectives of the invention (which other objectives become clear by consideration of the specification, claims and drawings as a whole) are met by providing a platform dolly with a strong, lightweight support platform; having a hinged lockable adjusting mechanism.

BRIEF DESCRIPTION OF THE DRAWINGS

Throughout the figures of the drawings, where the same part appears in more than one figure of the drawings, the same number is applied thereto.

DESCRIPTION OF THE PREFERRED EMBODIMENTS

Figure 1:
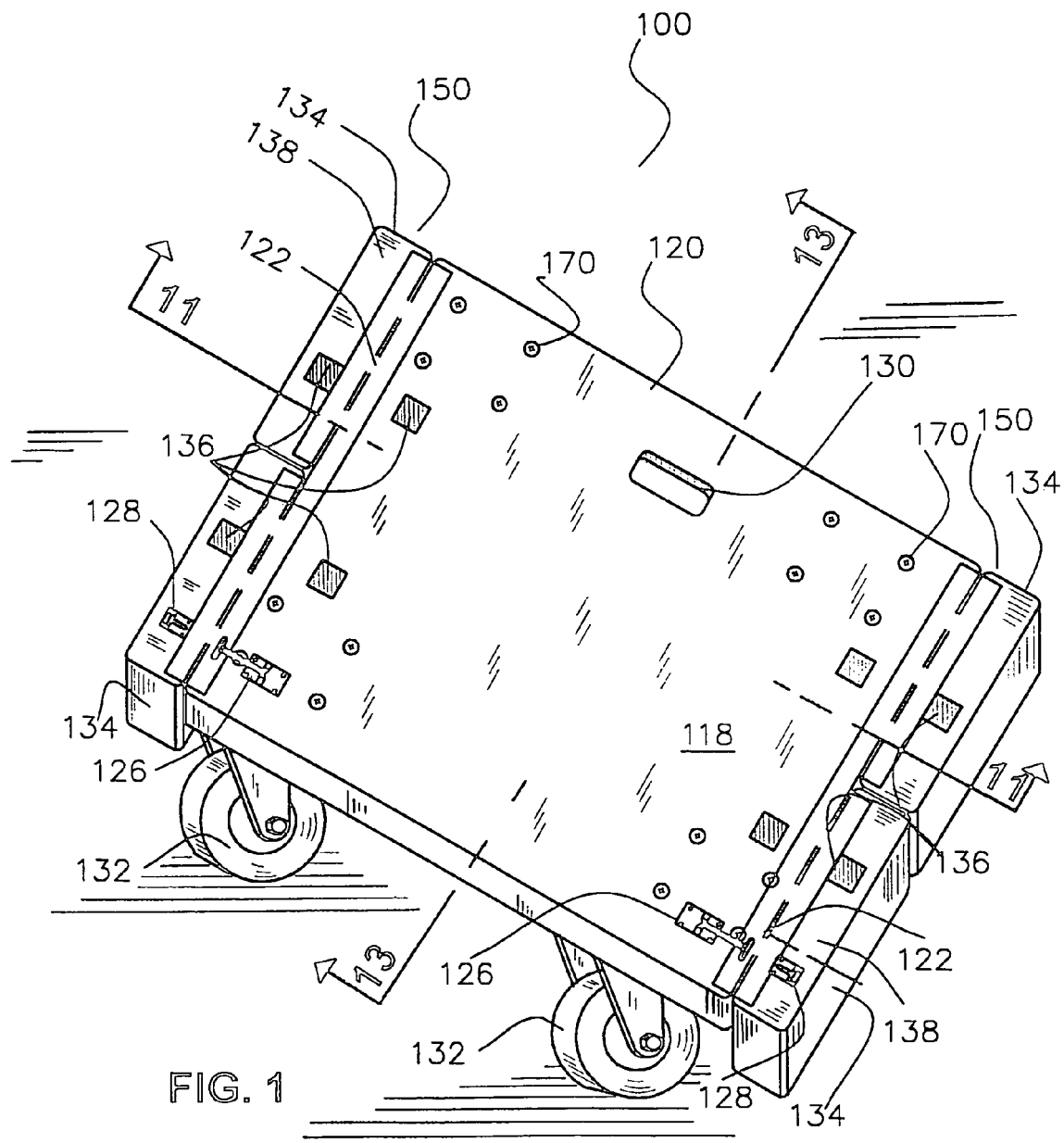
FIG. 1 depicts an overall perspective view of a lightweight platform dolly 100 according to the invention.

In this invention, because of the lightweight platform construction, a protective coating is applied to the lightweight platform dolly, with adjustable bumper blocks, which assist with items placed on the lightweight platform dolly. This invention solves these problems, because the lightweight platform dolly's height and length can be easily adjusted. This invention has universal application and is easily portable.

Advantages of a lightweight dolly include less fatigue for workers moving large objects and stacks of many dollies. It is easier to carry back to the truck. Because of the thinner platform, less weight, and the handle location, a worker can easily carry four of these dollies at a time. Prior art frame dollies are typically carried two at a time, one in each hand. With a thinner platform more dollies can be stacked higher and with less weight than prior art dollies.

Another advantage of the lightweight platform dolly is that it is wider than prior art dollies. The lightweight platform dolly width is sized to accommodate four dollies across a typical truck with minimal excess space for movement during transport. The wider platform has a wider wheel base which provides more stability for tall and large loads. A loaded lightweight platform dolly of this invention can be positioned in a transportation vehicle four across when loaded and easily unloaded in the same fashion.

The lighter, wider platform dolly accommodates easier loading of today's furniture and appliance designs. Computer workstations, overstuffed couches, entertainment centers, and electronic cabinetry are wider and require a larger platform for secure loading. Another advantage of the wider platform dolly is its adaptability for rolling large containers and speed pack cartons used in manufacturing plants.

The invention uses a fabricated composite construction to produce a strong, lightweight solid platform dolly. One example of the composite construction is a resin-impregnated carbon fabric. Still, another example of the composite construction is the resin-coated balsa wood. The lightweight construction allows additional features to be incorporated which makes the lightweight platform dolly adjustable and multi-functional.

Many suitable lightweight cores, known in the composite industry, may be used in the formation of a lightweight platform dolly of this invention. Balsa wood is very suitable as a lightweight core because of its stiff, lightweight characteristics. Plywood also has attributes similar to balsa wood.

Many honeycombed or foamed plastics are suitable lightweight cores too. Foamed polystyrene and foamed polyurethane are suitable cores. Also other foamed polymers are operable. Epoxy is also operable. A honeycomb polymer structure, when coated with a durable polymer or resin, is also acceptable.

The resin coated balsa wood is believed to be extremely effective for the lightweight platform dolly of this invention, because lightweight wood is reinforced by the resin. A resin or polymer impregnated fabric covering the balsa wood is very effective. Vacuum-formed plastic is also an effective core. With such reinforcement, the resin coating can take the pounding imposed by the items placed thereon.

A plurality of casters is mounted to the bottom of the support platform with a plurality of caster fastening bolts or other suitable device, which are secured in corresponding caster fastening apertures disposed at the corners. The support platform and bumper blocks are covered by a coating to secure and protect loads and walls. The support platform has a through grip aperture parallel to the long dimension of the lightweight platform dolly, which may be used as a handle.

In order to point out the features of the present invention, the following preferred embodiments are presented. FIG. 1 shows an overall perspective view of the lightweight platform dolly 100. Lightweight platform dolly 100 includes a rectangular support platform 120 with length and width being its greatest dimensions, while thickness is its least dimension. A flexible hinge 122 attaches each of four bumper blocks 134 thereto.

Flexible hinge 122 may be made of a flexible plastic; which may be sonic welded, glued, or otherwise fastened to or between support platform 120 and bumper block 134. Flexible hinge 122 may also be the hinge and pintle combination, nylon strapping or other strong flexible material.

Figure 2:
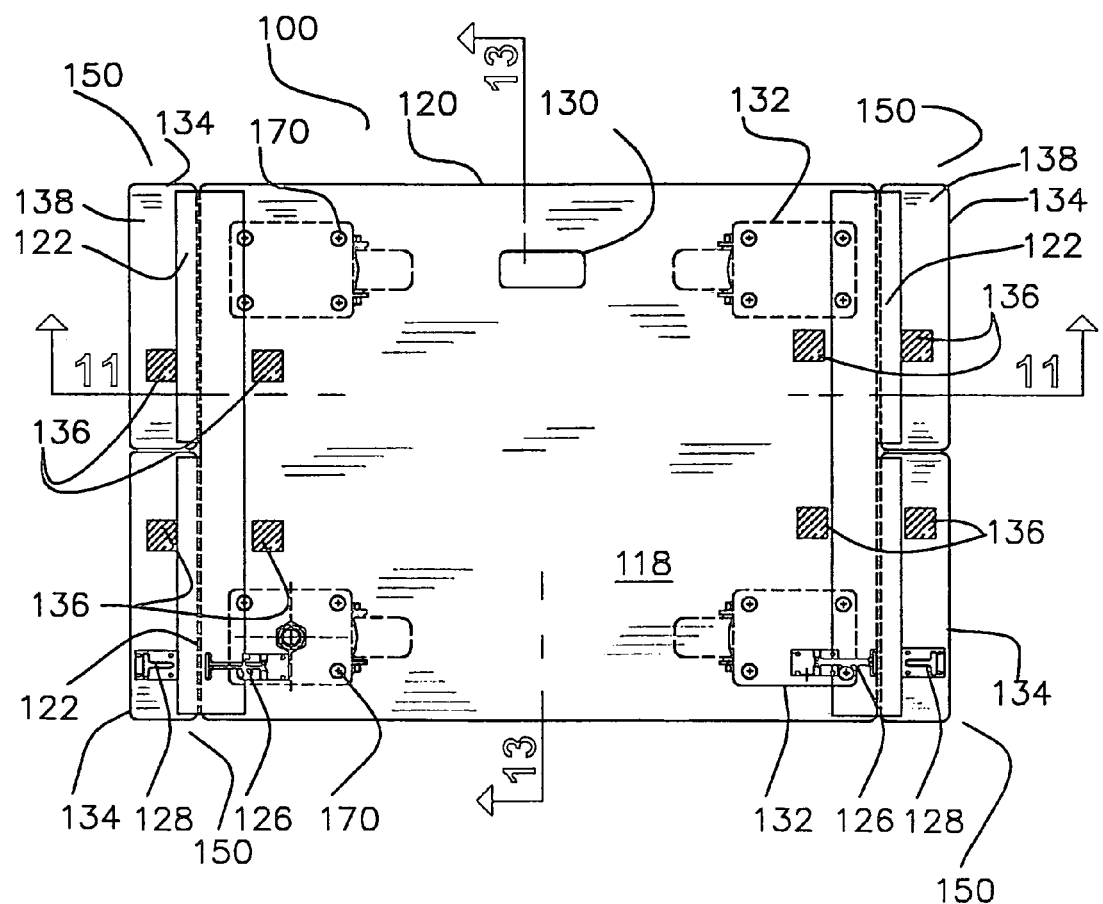
FIG. 2 depicts a top plan view of the lightweight platform dolly 100 according to the invention with all of the four bumper blocks 134 in down position 150.
Figure 3:
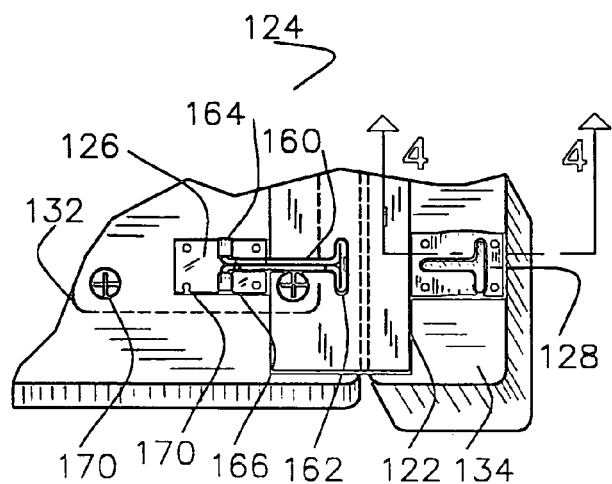
FIG. 3 depicts a top plan view of the bar and receiver assembly 124 for lightweight platform dolly 100.
Figure 4:
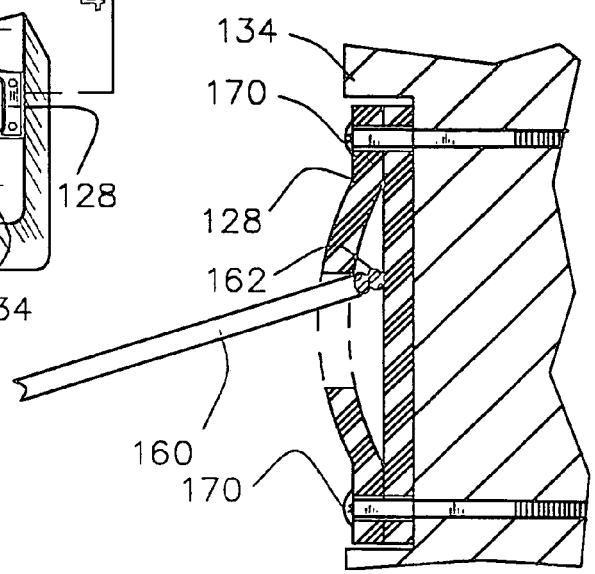
FIG. 4 depicts a cross-sectioned, side view of the bar and receiver assembly 124 for lightweight platform dolly 100.
Figure 5:
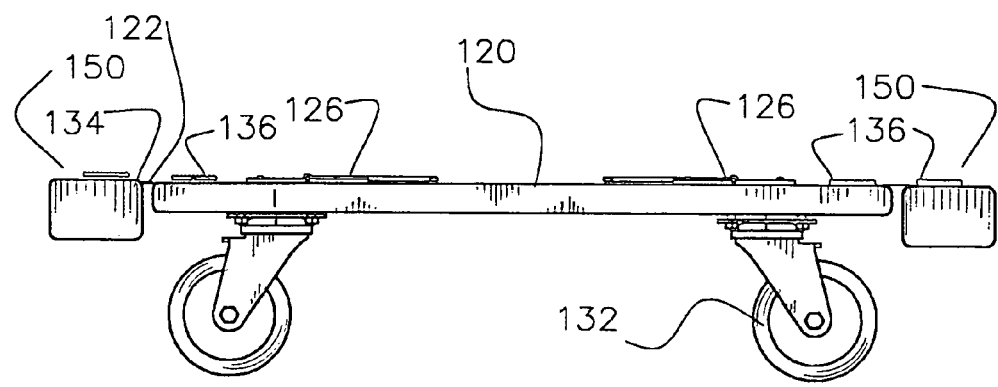
FIG. 5 depicts a side view of the lightweight platform dolly 100 with all four bumper blocks 134 in down position 150.
Figure 6:
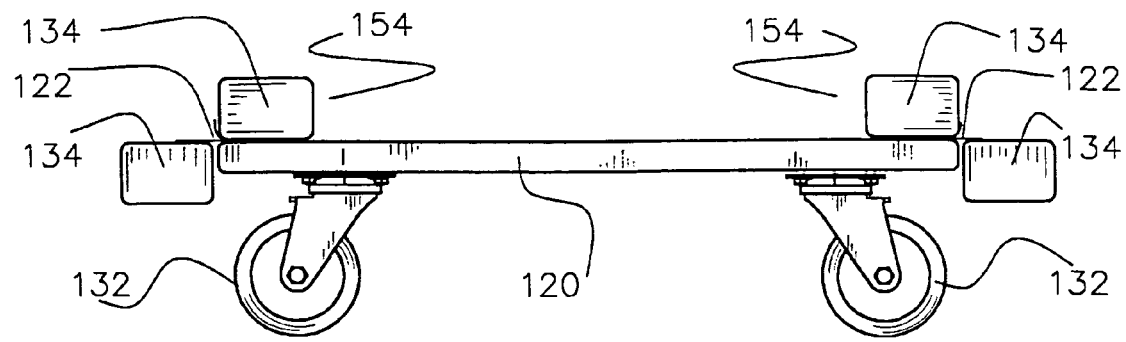
FIG. 6 depicts a side view of the lightweight platform dolly 100 with two of the four bumper blocks 134 rotated 180 degrees to the top position 154 of the support platform 120.
Figure 7:
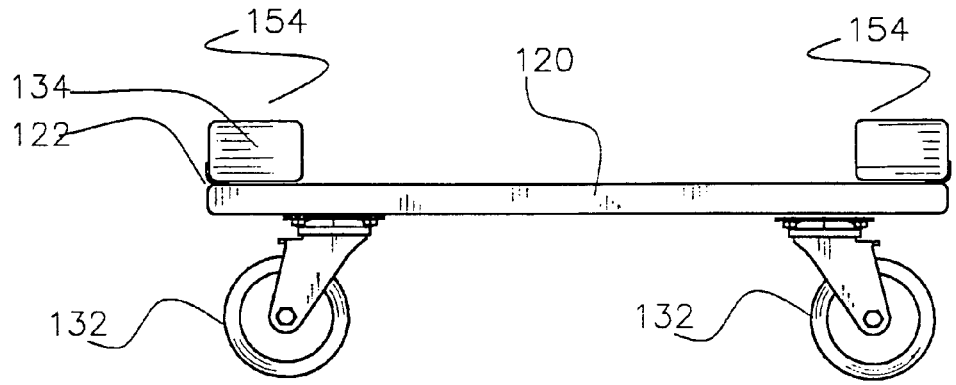
FIG. 7 depicts a side view of the lightweight platform dolly 100 with all four bumper blocks 134 rotated 180 degrees to the top of the support platform 120.
Figure 8:
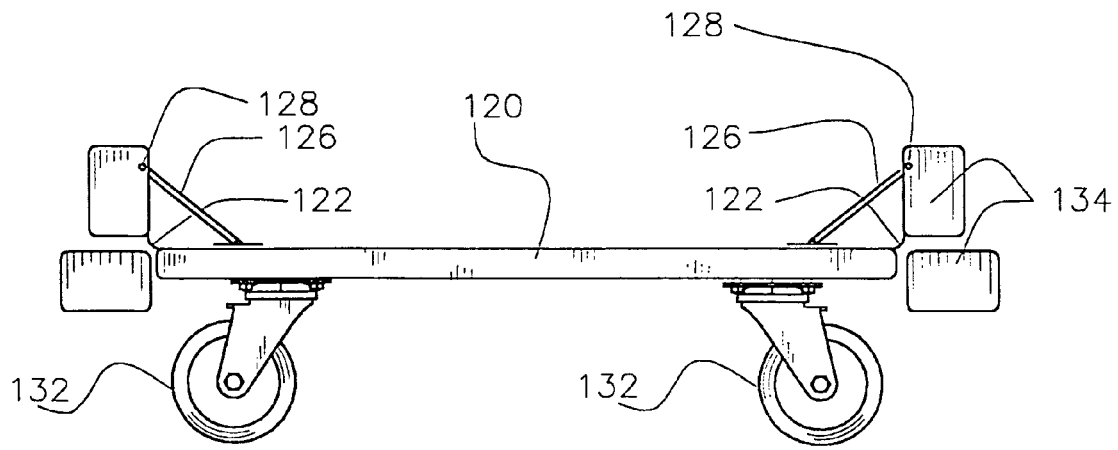
FIG. 8 depicts a side view of the lightweight platform dolly 100 with two bumper blocks rotated 90 degrees and held in position with T-bar block holders 126.

FIG. 1 and FIG. 2 combine to show different views of the preferred embodiment of lightweight platform dolly 100. The embodiments include caster wheels 132 attached to the underside of each corner of the support platform 120. Four bumper blocks 134 are attached to the support platform 120 with a flexible material such as flexible hinge 122.

Each bumper block 134 has positioning device 136 to hold it in a desired position. Positioning device 136 serves to hold each bumper 134 adjacent to support platform 120 as desired. Preferably, the positioning device 136 is a hook and loop assembly, commonly available under the registered trademark VELCRO, owned by Velcro Industries B.V. LIMITED LIABILITY COMPANY NETHERLANDS Castorweg 22-24 Curacao NETHERLANDS ANTILLES. Part of positioning device 136 is on the upper face 138 of bumper blocks 134 and the other part on support platform 120. In this fashion, bumper block 134 can be held on support platform 120 in top position 154, or released therefrom to down position 150.

On either end of the support platform 120, a bar and receiver assembly 124 includes T-bar block holder 126, located in the corner of the support platform 120 on the same longitudinal side of the top plane. The T-bar block holder 126 is a bent wire bar 160 with a T-shaped head 162 and a hinged base 164. Hinged base 164 is secured by hinge plate 166 to support platform 120. Hinge plate 166 is secured by screws 170 or other fastener, and permits bent wire bar 160 to rotate 180 degrees therein.

The T-bar block holder 126, at T-shaped head 162 locks into a T-bar receiver 128 on the bumper block 134. The T-bar receiver 128 is located in alignment with the T-bar block holder 126 on the top plane, that is the top of the support platform 120. The T-bar receiver 128 is a concave area designed to prevent the bumper block 134 from moving backward or forward. T-bar block holder 126 holds bumper block 134 at a right angle to support platform 120.

The bumper blocks 134 fold up to secure a load such as dresser 102 on a steep incline. When the bumper blocks 134 are rotated to an upright position, they provide greater containment of loads in manufacturing plants and during transport. The bumper blocks 134 can be adjusted and locked in position to accommodate loads that have uneven bottom surfaces, not shown but exemplified by such as desks, big screen televisions, and dressers.

Another unique advantage of the bumper blocks 134 is that two blocks 134 can be locked in the 90-degree position by T-bar assembly 124 to secure the rear of a typical dresser 102 in an upright position while accommodating the lower dresser skirt in front.

The support platform 120 has a hand grip aperture 130 located near the longitudinal side as a handle to carry the lightweight platform dolly 100. The coating 118 preferably completely covers support platform 120 and the bumper blocks 134 cushioning and protecting the load, the lightweight platform dolly 100, and walls that may be contacted during moving.

FIG. 5, FIG. 6, FIG. 7 and FIG. 8 show how the four bumper blocks 134 can be adjusted for varying loads. These figures show the movement of bumper blocks 134 from the end of the support platform 120 to the top of support platform 120, which varies the height, and length of the lightweight platform dolly 100. No tools are required for any of these adjustments. The flexible hinges 122 facilitate these adjustments.

Figure 9:
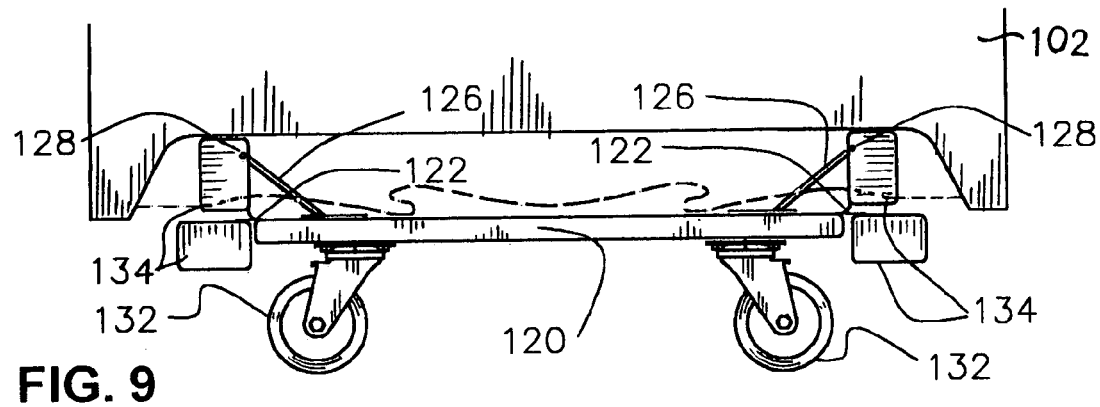
FIG. 9 depicts a side view of the lightweight platform dolly 100 with two bumper block 134 locked in place and loaded with a dresser 102.
Figure 10:
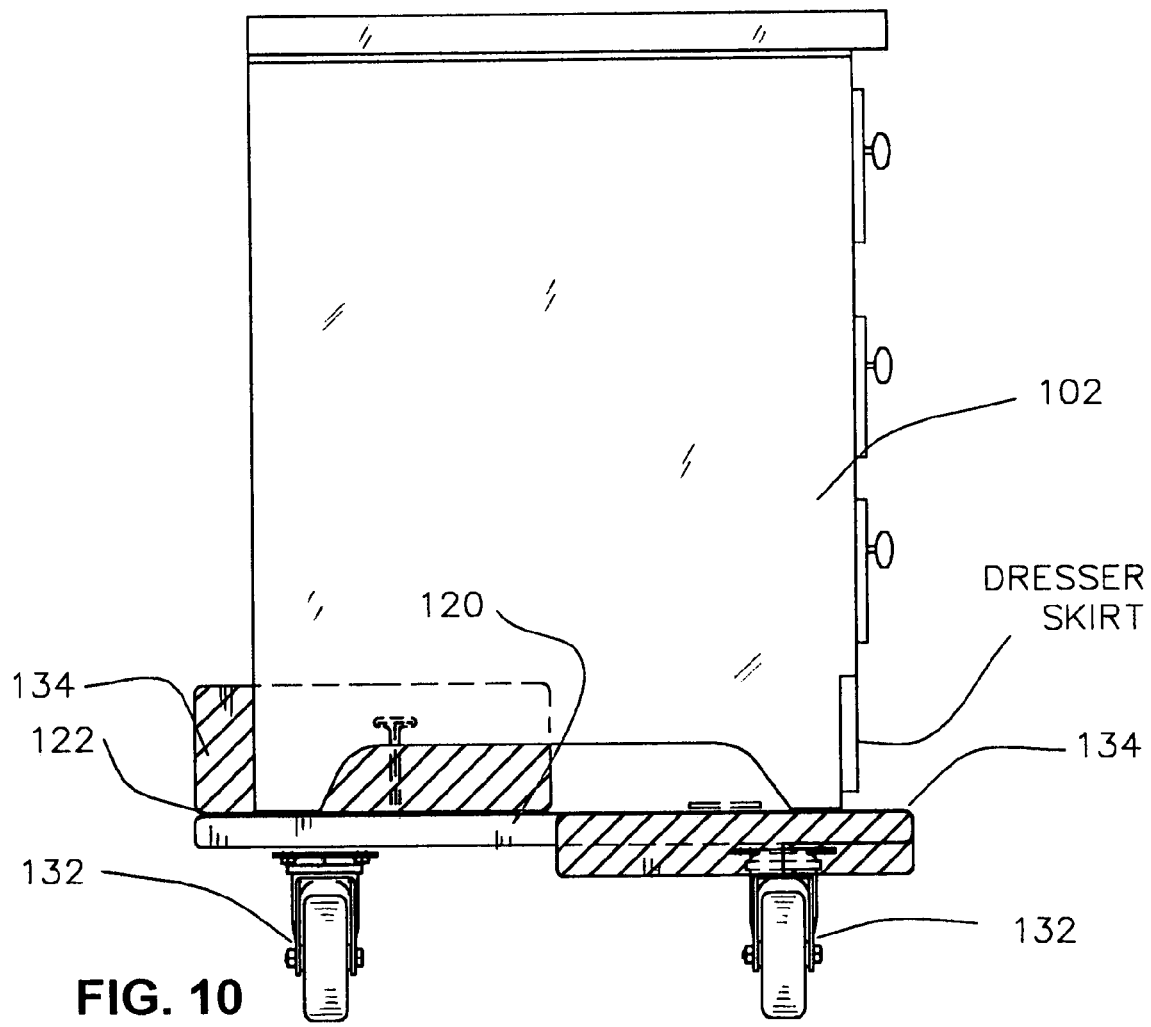
FIG. 10 depicts an end view of the lightweight platform dolly 100 with one bumper block 134 locked in place and loaded with a dresser 102.

FIG. 9 (a side view) and FIG. 10 (an end view) combine to depict. They show the long and short side of the lightweight platform dolly 100. They show a bumper block 134 in an upright 90-degree position held by a T-bar block holder 126 locked into a T-bar receiver 128. This position is designed to accommodate the rear bottom of a dresser 102 (FIGS. 9 and 10). Other adjustments of bumper blocks 134 are possible as desired, depending on the piece of furniture to be supported thereon.

Figure 11:
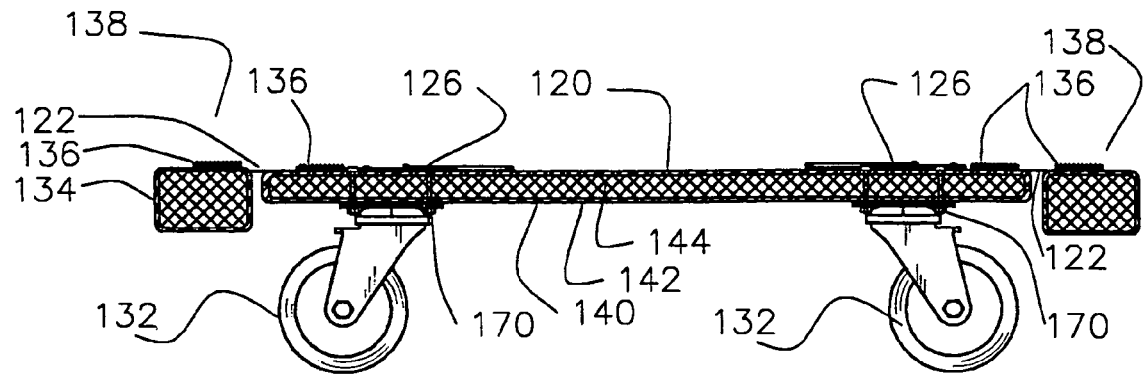
FIG. 11 depicts a longitudinal sectional view of the lightweight platform dolly 100 taken along the section Line 11—11 shown in FIGS. 1 and 2.

FIG. 11 depicts a longitudinal section along section Line 11—11, as shown on FIGS. 1 and 2, that shows the composite fabricated core construction of the support platform 120 and bumper blocks 134. The section also shows the flexible hinges 122.

Figure 12:
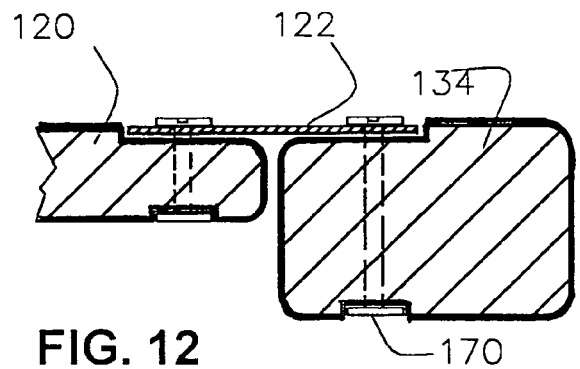
FIG. 12 depicts a detailed cross sectional view of bumper block 134 and flexible hinge 122 attached to support platform 120.

FIG. 12 depicts a detail cross section of the material for flexible hinge 122 attaching bumper block 134 to support platform 120. Screws 170, or other appropriate fasteners, secure flexible hinge 122 to both bumper block 134 and support platform 120.

Figure 13:
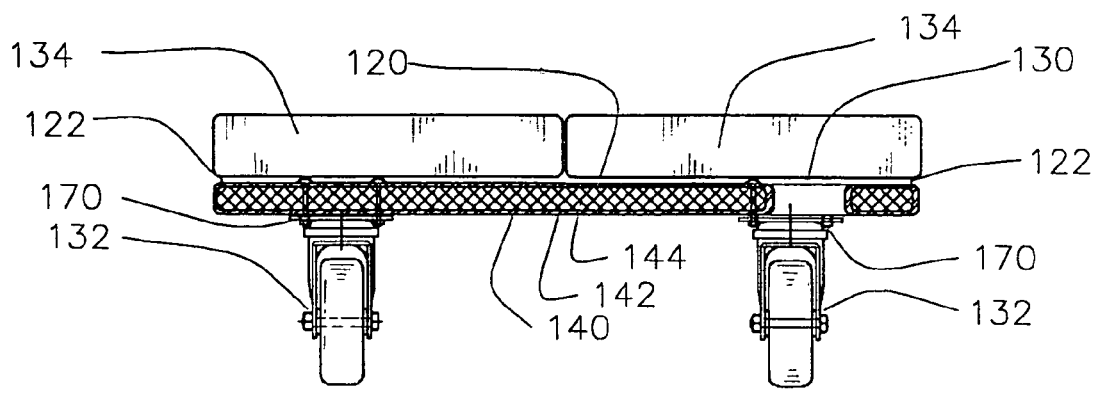
FIG. 13 depicts a longitude cross sectional view of the lightweight platform dolly 100 taken along the section Line 13—13 shown in shown in FIG. 2.

FIG. 13 depicts a short side latitudinal cross section through the platform 120 depicting the view through hand grip aperture 130 and the composite fabricated construction of the support platform 120, based on Line 13—13 of FIGS. 1 and 2. Both the support platform 120 and the bumper blocks 134 are formed from resin 140 or composite, fabricated fibers 142 impregnated with a resin and formed, and laminated or coated over a lightweight core 144 for maximum strength and minimal weight.

From the description above regarding the use of dollies, a number of advantages of the adjustable lightweight platform dolly 100 of this invention become evident. One of the advantages of the support platform 120 is its ability to hold small objects that can otherwise fall through on a typical frame platform dolly. The support platform 120 also holds items with legs that will go through a typical frame dolly. The major unique advantage of support platform 120 is its flexible hinges 122 supporting bumper blocks 134.

The hinging operation allows objects with an uneven base to be loaded onto lightweight platform dolly 100 in an upright position. For example, large dressers and cabinets are usually tipped on their end or side, which exposes the tops of finished furniture to damage. With the lightweight platform dolly 100 of this invention, dressers can be moved upright which protects tops and prevents drawers and contents from being displaced.

The operation of the flexible hinge 122 for bumper blocks 134 also facilitates adjustment of the lightweight platform dolly 100 to lower the object for elevators and doorways. The flexible hinge 122 supporting bumper blocks 134 also permit the lightweight platform dolly 100 to be lengthened for objects such as a chest of drawers instead of tipping the chest of drawers and exposing it to damage. The bumper blocks 134 fold up to secure loads on steep inclines, or for production line applications. They lock in place for is dressers as shown in FIG. 9 and FIG. 10.

Some of the most important operational advantages of the lightweight platform dolly 100 of this invention are as follows. It is multi-functional which eliminates the need for multiple dollies. The lightweight construction of the lightweight platform dolly 100 of this invention improves the operation of manually moving objects and manually stacking dollies. A lighter lightweight platform dolly 100 is easier to move under objects and to carry.

The coating 118 covers support platform 120 and bumper blocks 134, which makes the load more secure than on prior art dollies. A load on platform dolly 100 is shown in the form of dresser 102 in FIGS. 9 and 10. Load refers to an item or items placed on the platform dolly 100, for the purpose of moving the same from one place to another. Dresser 102 merely represents the various loads for platform dolly 100.

The adjustable lightweight platform dolly 100 may be constructed of varying composite cores, fabrics, and coverings required for unique situations such as in the chemical, medical, or food industries. The bumper blocks can be reconfigured and customized for unlimited adaptability to specific uses. Because of the lightweight construction, the overall size of the lightweight platform dolly 100 can be altered to meet aviation requirements.

The overall protective coating of the lightweight platform dolly 100 of this invention can be made in a variety of colors or with a company logo to prevent theft, to differentiate loads to be disseminated to different locations, to advertise, and to provide other suitable services. The larger support platform 120 for lightweight platform dolly 100 provides more area for logos.

Figure 14:
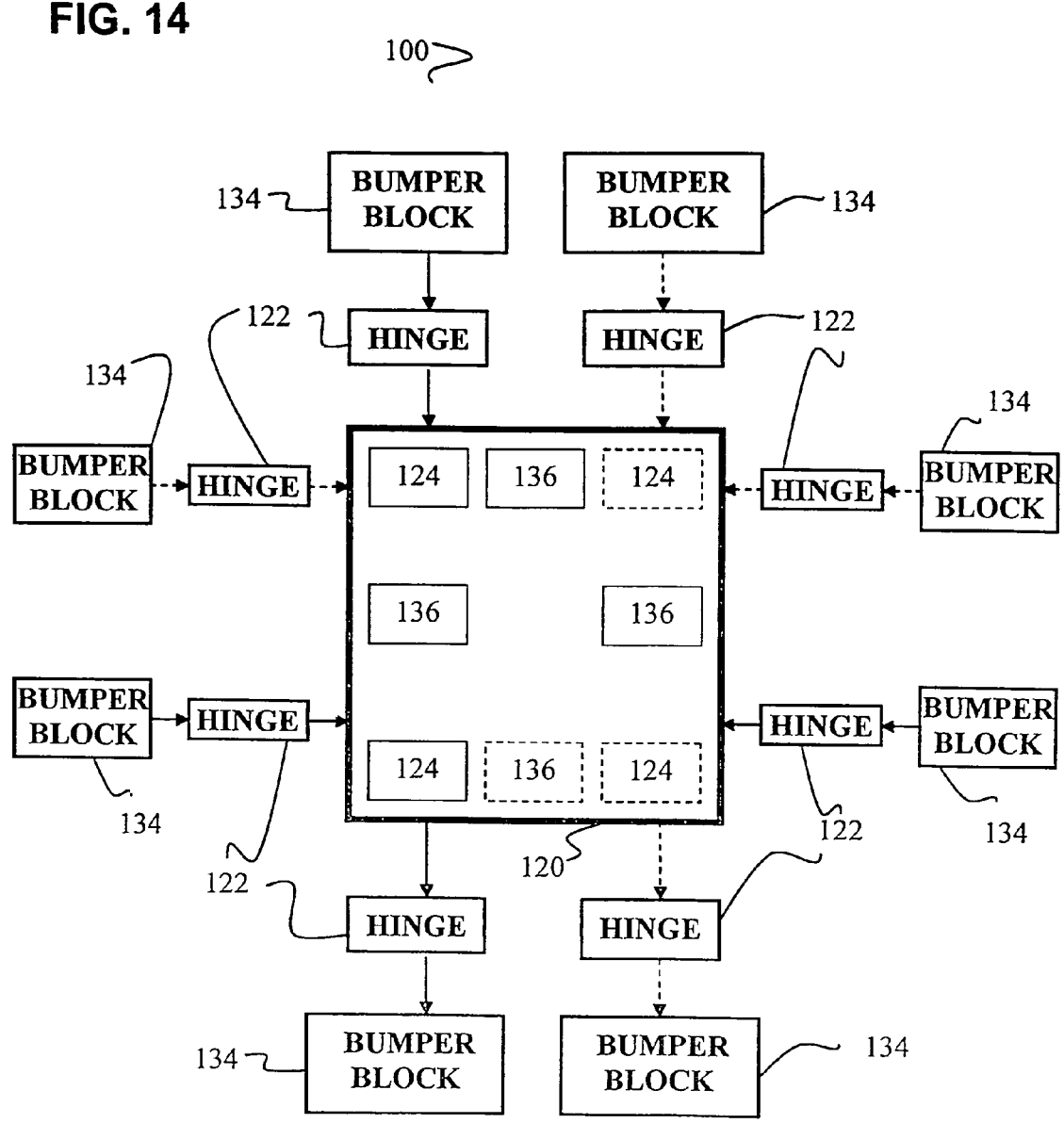
FIG. 14 depicts a block diagram for the lightweight platform dolly 100 of this invention.

With the consideration of FIG. 14, the variety of feasible structures for the lightweight platform dolly 100 becomes clear. To support platform 120, each bumper block 134 is secured by flexible hinge 122. Support platform 120 is generally rectangular and may have a flexible hinge 122 on every side thereof in order to support as many bumper blocks 134 as desired. Flexible hinge 122 may also be releasable in order to permit adding or removing of bumper blocks 134 as desired.

Numerous characteristics, advantages, and embodiments of the invention are described in detail in the foregoing description with reference to the accompanying drawings. However, the disclosure is illustrative only and the invention goes beyond the precisely illustrated embodiments. Various changes and modifications may be effective therein by one skilled in the art without departing from the scope or sprit of the invention.

This application; taken as a whole with the abstract, specification, claims, and drawings being combined; provides sufficient information for a person having ordinary skill in the art to practice the invention as disclosed and claimed herein. Any measures necessary to practice this invention are well within the skill of a person having ordinary skill in this art after that person has made a careful study of this disclosure.

Because of this disclosure and solely because of this disclosure, modification of this method and device can become clear to a person having ordinary skill in this particular art. Such modifications are clearly covered by this disclosure.

The invention claimed is:

1. A platform dolly having a platform support comprising:
   (a) the platform dolly including the platform support having casters and an adjustable locking mechanism mounted thereon;
   (b) a composite material forming the platform support;
   (c) the composite material providing light weight and great strength for the platform support;
   (d) the platform support having at least one adjustable bumper block mounted on at least one edge thereof;
   (e) the at least one adjustable bumper block serving to adjust at least one factor selected from the group consisting of a width of the platform support a height of the platform support and a length of the platform support;
   (f) at least one securing means supporting the at least one adjustable bumper block in a desired position;
   (g) the platform support having a rectangular shape;
   (h) the at least one adjustable bumper block being a first pair of adjustable bumper blocks and a second pair of adjustable bumper blocks;
   (i) the first pair of adjustable bumper blocks being on a first side of the rectangular shape;
   (j) the second pair of adjustable bumper blocks being on a second side of the rectangular shape;
   (k) the first side of the rectangular shape being oppositely disposed from the second side of the rectangular shape;
   (l) the first pair of adjustable bumper blocks being positionable relative to the first side of the rectangular shape; and
   (m) the second pair of adjustable bumper blocks being positionable relative to the second side of the rectangular shape.

2. The platform dolly of claim 1 further comprising:
   (a) a first hinge system securing the first pair of adjustable bumper blocks to the first side of the rectangular shape; and
   (b) a second hinge system securing the second pair of adjustable bumper blocks to the second side of the rectangular shape;
   (c) at least one securing means supporting the at least one adjustable bumper block in a first desired position;
   (d) at least one positioning means positioning the at least one adjustable block in a second desired position.

3. The platform dolly of claim 2 further comprising:
   (a) the securing means comprising a T-bar block holder and T-bar receiver oppositely disposed on the at least one adjustable block and the rectangular shape;
   (b) the securing means being adapted to hold the at least one adjustable bumper block at a right angle to the platform support;
   (c) the positioning means comprising a loop portion of fastener with a hook portion being oppositely disposed on the rectangular shape; and
   (d) the positioning means being adapted to hold the at least one adjustable bumper block adjacent to the platform support.

4. The platform dolly of claim 3 further comprising:
   (a) the first hinge system including a first hinge for a first member of the first pair of adjustable bumper blocks;
   (b) the first hinge system including a second hinge for a second member of the first pair of adjustable bumper blocks;
   (c) the second hinge system including a third hinge for a first member of the second pair of adjustable bumper blocks; and (d) the second hinge system including a second hinge for a second member of the second pair of adjustable bumper blocks.

5. The platform dolly of claim 4 further comprising:
(a) the T-bar block holder having a hinge assembly and oppositely disposed from a T-bar receiver on the at least one adjustable block and the support platform rectangular shape;
(b) the hinge assembly including a hinged plate and a bent wire bar;
(c) the bent wire bar having a T-shaped head oppositely disposed from a hinged base;
(d) the hinge plate receiving the hinged base in movable relationship; and
(e) the T-bar receiver receiving the T-shaped head.

6. The platform dolly of claim 5 further comprising:
(a) the T-bar block holder being present for each of the at least one adjustable bumper block;
(b) the at least one adjustable bumper block serving to adjust at least one dimension of the platform dolly selected from the group consisting of a height of the platform support, and the width of the platform; and
(c) the first hinge system and the second hinge system including at least one flexible hinge.

7. The platform dolly of claim 6 further comprising:
(a) the T-bar block holder holding the at least one bumper block in an upright 90-degree position relative to the platform support;
(b) the at least one bumper block and the platform support being formed from a composite fabricated structure; and
(c) the composite fabricated structure being light weight.

8. The platform dolly of claim 7 further comprising:
(a) a coating covering the platform dolly; and
(b) the coating serving at least one function selected from the group consisting of a decorative function and an identity function.

9. The platform dolly of claim 7 further comprising:
(a) the platform support serving at least one function selected from the group consisting of a decorative function and an identity function;
(b) the platform support having a generally rectangular shape;
(c) the platform support having the flexible hinge on each side thereof; and
(d) the flexible hinge on each side thereof having a member of the at least one bumper block mounted thereon.

10. The platform dolly of claim 9 further comprising:
(a) the flexible hinge being releasable in order to permit adding or removing of the at least one bumper block;
(b) the composite construction being at least one material selected from the group consisting of resin coated balsa wood, resin fabric covering balsa wood and resin impregnated carbon fabric;
(c) a caster wheel mounted at each corner of the rectangular shape;
(d) the platform support including a platform aperture for use as a handle.

11. A platform dolly having a platform support comprising:
(a) the platform dolly including the platform support having casters and an adjustable locking mechanism mounted thereon;
(b) a composite material forming the platform support;
(c) the composite material providing light weight and great strength for the platform support;
(d) the platform support having at least one adjustable bumper block mounted on at least one edge thereof;
(e) the at least one adjustable bumper block serving to adjust at least one factor selected from the group consisting of a width of the platform support, a height of the platform support and a length of the platform support;
(f) the composite construction being at least one material selected from the group consisting of resin coated balsa wood, and resin fabric covering balsa wood;
(g) at least one securing means supporting the at least one adjustable bumper block in a desired position;
(h) the platform support having a rectangular shape;
(i) the at least one adjustable bumper block being a first pair of adjustable bumper blocks and a second pair of adjustable bumper blocks;
(j) the first pair of adjustable bumper blocks being on a first side of the rectangular shape;
(k) the second pair of adjustable bumper blocks being on a second side of the rectangular shape;
(l) the first side of the rectangular shape being oppositely disposed from the second side of the rectangular shape;
(m) the first pair of adjustable bumper blocks being positionable relative to the first side of the rectangular shape; and
(n) the second pair of adjustable bumper blocks being positionable relative to the second side of the rectangular shape.

12. The platform dolly of claim 11 further comprising:
(a) a first hinge system securing the first pair of adjustable bumper blocks to the first side of the rectangular shape; and
(b) a second hinge system securing the second pair of adjustable bumper blocks to the second side of the rectangular shape;
(c) at least one securing means supporting the at least one adjustable bumper block in a first desired position;
(d) at least one positioning means positioning the at least one adjustable block in a second desired position.

13. The platform dolly of claim 12 further comprising:
(a) the securing means comprising a T-bar block holder and T-bar receiver oppositely disposed on the at least one adjustable block and the rectangular shape;
(b) the securing means being adapted to hold the at least one adjustable bumper block at a right angle to the platform support;
(c) the positioning means comprising a loop portion of fastener with a hook portion being oppositely disposed on the rectangular shape; and
(d) the positioning means being adapted to hold the at least one adjustable bumper block adjacent to the platform support.

14. The platform dolly of claim 13 further comprising:
(a) the first hinge system including a first hinge for a first member of the first pair of adjustable bumper blocks;
(b) the first hinge system including a second hinge for a second member of the first pair of adjustable bumper blocks;
(c) the second hinge system including a third hinge for a first member of the second pair of adjustable bumper blocks; and
(d) the second hinge system including a second hinge for a second member of the second pair of adjustable bumper blocks.

15. The platform dolly of claim 14 further comprising:
(a) the T-bar block holder having a hinge assembly and oppositely disposed from a T-bar receiver on the at least one adjustable block and the support platform rectangular shape;
(b) the hinge assembly including a hinged plate and a bent wire bar;
(c) the bent wire bar having a T-shaped head oppositely disposed from a hinged base;
(d) the hinge plate receiving the hinged base in movable relationship; and
(e) the T-bar receiver receiving the T-shaped head.

16. A method of moving a heavy item with a platform dolly comprising:
(a) providing a composite construction platform dolly with a rectangular platform support;
(b) mounting at least one adjusting means on the support platform;
(c) positioning the at least one adjusting means in order to support a desired item to be moved;
(d) supporting the desired item to be moved on the platform dolly;
(e) moving the desired item to be moved on the platform dolly;
(f) adjusting at least one element of the platform support selected from the group consisting a length of the platform dolly, a height of the platform dolly a width of the platform dolly with a T-Bar block holder and a hook and loop assembly to form an adjusted platform support; and
(g) mounting the item to be moved on the adjusted platform support.

* * * * *